(12) United States Patent
Trinkaus et al.

(10) Patent No.: US 7,320,191 B2
(45) Date of Patent: Jan. 22, 2008

(54) SPORTS SHOE, IN PARTICULAR A SKI SHOE

(75) Inventors: Gerhard Trinkaus, Köflach (AT); Helmut Holzer, St. Johann (AT)

(73) Assignee: ATOMIC Austria GmbH, Altenmarkt im Pongau (AT)

( * ) Notice: Subject to any disclaimer, the term of this patent is extended or adjusted under 35 U.S.C. 154(b) by 432 days.

(21) Appl. No.: 10/896,389

(22) Filed: Jul. 22, 2004

(65) Prior Publication Data

US 2005/0016027 A1 Jan. 27, 2005

(30) Foreign Application Priority Data

Jul. 24, 2003 (AT) .............. A 1171/2003

(51) Int. Cl.
*A43B 5/00* (2006.01)

(52) U.S. Cl. .............. 36/118.2; 36/118.7; 36/118.9

(58) Field of Classification Search .......... 36/115, 36/117.1, 118.2, 118.7, 118.9
See application file for complete search history.

(56) References Cited

U.S. PATENT DOCUMENTS

| 4,697,360 A | 10/1987 | Sartor |
| 4,724,626 A | 2/1988 | Baggio |
| 4,739,563 A * | 4/1988 | Guggenberger et al. ... 36/117.4 |
| 4,741,115 A | 5/1988 | Pozzobon |
| 4,787,124 A * | 11/1988 | Pozzobon et al. ........ 24/68 SK |
| 5,033,213 A * | 7/1991 | Mabboux et al. ............. 36/2.6 |
| 5,086,573 A * | 2/1992 | Mabboux et al. ............. 36/2.6 |
| 5,107,608 A | 4/1992 | Kreitenberg |
| 5,136,794 A | 8/1992 | Stampacchia et al. |
| 2002/0095822 A1 | 7/2002 | Challande |

FOREIGN PATENT DOCUMENTS

| DE | 41 12 575 | 10/1991 |
| EP | 0 213 520 | 3/1987 |
| EP | 0 917 833 | 5/1999 |
| EP | 0 940 096 | 9/1999 |
| EP | 1 023 847 | 8/2000 |

* cited by examiner

*Primary Examiner*—Marie Patterson
(74) *Attorney, Agent, or Firm*—Collard & Roe, P.C.

(57) ABSTRACT

The invention relates to a sports shoe (1), in particular a ski shoe (2), consisting of a shoe bottom part (3) comprising a sole (4) and a shell part (5) with a cuff part (7) pivotably connected to the shoe bottom part (3), and a lock mechanism (16) incorporating at least one locking means (17) displaceable between the shell part (5) and the cuff part (7), as well as an actuator drive (29) for the locking means (17). The actuator drive (29) is conductively connected to an energy store and/or an energy source (42) disposed in the shoe bottom part (3) or in the cuff part (7) and a switch means (44) is connected upstream of the actuator drive (29) to supply the actuator drive (29) with power from the energy source (42) and/or the energy store.

24 Claims, 9 Drawing Sheets

SPORTS SHOE, IN PARTICULAR A SKI SHOE

CROSS REFERENCE TO RELATED APPLICATIONS

Applicants claim priority under 35 U.S.C. § 119 of Austrian Application Serial No. A 1171/2003, Filed on Jul. 24, 2003.

BACKGROUND OF THE INVENTION

1. Field of the Invention

The invention relates to a sports shoe, in particular a ski shoe, consisting of a shoe bottom part comprising a sole and a shell part, and having a cuff part which is pivotably connected to the shoe bottom part, and a lock mechanism with at least one displaceable locking means between the shell part and the cuff part and an actuator drive for the locking means.

2. The Prior Art

EP 1 023 847 A2 discloses an adjusting mechanism for a sports boot comprising a shell and a cuff pivotably attached to it, designed to fix a predefined angular position, and the cuff incorporates an adjusting means pivotable about an axis which can be adjusted by means of an operating mechanism, disposed in the sole of the sports boot, and a transmission means linking it and the actuator means, from a position permitting the pivoting action into a position blocking the pivoting action. Projecting above a support surface of the sole is a spring-biassed operating means which is directly connected to the transmission means and is displaced against the action of the spring force when acted on by a force, e.g. the weight of the user of the sports boot, and a biassing force applied by a ski binding, and this displacement causes the adjusting means to be moved into the locked position via the transmission means.

A sports shoe is also known from U.S. Ser. No. 2002/0095822 A1, in particular a ski shoe, consisting of a shoe bottom part with a cuff pivotably attached to it and having a lock mechanism which permits the pivoting action or blocks the pivoting action in a direction opposing the onward displacement. An operating element of the lock mechanism is disposed in the sole of the shoe bottom part so that it can be linearly displaced and projects above a biassing surface for a coupling element of a clamping mechanism, in particular a heel jaw of a ski binding, and is connected to a pivotably mounted lever element in the shell part by means of a cable pull which serves as the transmission means. When a force acts on the operating element via the coupling part, the lever element pivots and an end face of the lever element forms a stop for a support surface of the cuff part, thereby pre-venting pivoting of the cuff and securing the desired forwardly inclined position. The full pivoting movement is restored when the clamping force of the coupling element is counteracted by a return force of a spring assembly causing the lever element to pivot inwards, which enables the joints of the foot to move in the manner needed for normal walking.

Another document, EP 0 940 096 A1, also discloses a system in the heel region of a sports shoe, and the shoe bottom part is provided with a lever system consisting of at least two levers pivotable relative to one another about a common axis. When one of the levers is operated by a coupling part, in particular a heel jaw of a ski binding, the other lever is pivoted into a position whereby a stop for a support surface of a cuff part is formed. This causes the pivoting motion to be locked and fixes the cuff part in a forwardly inclined position.

SUMMARY OF THE INVENTION

The objective of the invention is to propose a sports shoe, in particular a ski shoe, with a lock mechanism between a shoe bottom part and a cuff part pivotably connected to it, whereby the lock mechanism can be easily operated to move between a position which locks and a position which releases the pivoting motion.

This objective is achieved by the invention due to the fact that the actuator is conductively connected to an energy store and/or a power source disposed in the shoe bottom part or in the cuff part, and a switch means is disposed upstream of the actuator in order to supply the actuator with power from the power source and/or the energy store. The surprising advantage of this is that the sports shoe can be adjusted, rapidly and without any complex manipulation, to the conditions prevailing during use which frequently vary between the need for the cuff part to be secured in a fixed position relative to a shoe bottom part or to be allowed to pivot freely.

The sports shoe can be provided in embodiments where the switch means are designed so as to be activated via an operating means and in particular to be remotely controlled without wires and/or the operating means incorporate a signal-transmitting module, for wirelessly transmitting signals in the short-wave frequency range, the advantage of which is that an adjustment can be made by remote operation.

In another advantageous embodiment of the sports shoe, the operating means and/or the switch means are provided with the signal-transmitting module and the signal-receiving module is designed to transmit signals in one or two directions so that a check can be run to ensure that the adjustment process has been successfully completed, increasing the safety factor when using a sports shoe of this design.

In another advantageous embodiment of the sports shoe, the operating means is provided in the form of a signal transmitting and receiving device, e.g. a watch, mobile telephone, PDA, WRISTOP etc., in which case use is often possible without having to carry extra devices in order to operate the lock mechanism.

In another possible embodiment of the sports shoe, the operating means is provided in the form of a switch element disposed on the cuff part or the shell part, offering an inexpensive solution combined with high operating reliability.

In yet another embodiment of the sports shoe, the operating means is provided in the form of a proximity sensor, enabling an automatic switching procedure for locking purposes, e.g. when the sports shoe is inserted in the heel jaw.

Also of advantage is another embodiment of the sports shoe in which the operating means is disposed on the cuff part or shell part or on an item of sports equipment, such as a ski, helmet, ski stick, ski mask, etc., because items of equipment that are used in conjunction with the sports shoe anyway can be fitted with an operating means, thereby obviating the need for extra accessories.

In other advantageous embodiments of the sports shoe, the power source is provided in the form of an energy store, e.g. a rechargeable accumulator, battery, fuel cell, pressure store, etc., and/or the energy store is conductively connected to a power source disposed in the shell part and/or on the cuff part, for example a solar cell unit, piezo element, inductive generator etc., which enables fault-free use of the sports shoe fitted with the lock mechanism for long periods of time.

In other advantageous embodiments of the sports shoe, the actuator means is provided in the form of an electric motor or a linear actuator, in particular an electromagnet, and/or the electromagnet is provided with a permanent magnet-armature, or the actuator means is provided in the form of a pressure cylinder which can be operated by a pressurising medium or by a spring arrangement or a rocking armature, etc., thereby enabling the use of a range of tried and tested components for actuating the lock mechanism.

Other embodiments of the sports shoe are also possible in which the switch means is designed to be manually operated and/or is operated by a bistable switch relay, in which case the lock mechanism can be operated by briefly applying power, thereby reducing power consumption.

In other solutions, the lock mechanism in the cuff part is mounted so that it can be displaced relative to a stationary catch element disposed on the shell part and/or the lock mechanism is mounted in the shell part in a specific position relative to a catch element on the cuff part, which means that the lock mechanism can be selectively mounted on the pivotable cuff part or on the shoe bottom part, thereby offering a range of simple design options.

In another embodiment of the sports shoe, the lock mechanism is adjustably biassed against the catch element and can be operated by compression or traction via a spring system, e.g. a compression spring, actuator spring, tension spring, etc., permitting automatic latching of the lock mechanism in the catch element from the unlocked position once the catch pin of the lock mechanism is in the correct position relative to a seating in the catch element during a pivoting movement of the cuff part.

In other advantageous embodiments of the sports shoe, the lock mechanism is mounted so as to be linearly displaceable or pivotable in the cuff part, which means that the lock mechanism can be adapted to suit different cuff designs specifically made for different requirements, depending on operating mode.

In one embodiment of the sports shoe, the lock mechanism is provided in the form of a housing sleeve displaceably mounted in the cuff part which adjustably accommodates the catch pin, which means that the unit is compact in terms of its size but the lock mechanism is nevertheless strong in terms of retaining forces.

In other advantageous embodiments, the actuator means is disposed in the cuff part or shell part or in the sole, thereby enabling adaptation to suit different designs of sports shoe.

In other embodiments of the sports shoe, a transmission means is provided between the actuator means and the lock mechanism and/or the transmission means is provided in the form of a roller-shaped sliding element or a wedge-shaped releasing slide or a threaded spindle or a cable pull or a flexible shaft, in which case the lock mechanism can be made as a separate unit, which means that various sports shoe designs are possible without restriction.

In one advantageous embodiment of the sports shoe, a tubular guide and bearing sleeve is fixedly attached to the cuff part and bears an actuator means so that it can be displaced with the catch pin in a direction perpendicular to the surface of the catch element, as a result of which only slight actuating forces are needed, making the drive low in terms of power consumption and ensuring that the lock mechanism is able to withstand strain.

Advantages are also to be had from other embodiments, in which the actuator drive of the locking means is provided in the form of an eccentric drive driven by an electric motor, with a drive gear incorporating an eccentric pin mounted on the guide and bearing sleeve so as to rotate about a rotation axis extending parallel with the surface, e.g. a worm gear, and/or the actuating means is mounted so that it can be displaced in the direction perpendicular to the surface of the catch element by the eccentric pin via actuator springs, which are alternately biassed between a locking and a release position of the catch pin and/or the actuator springs biassed by the eccentric pin are secured to the actuator means so as to be immobile and are preferably provided in the form of spring wires and/or the drive gear rotates by 180° between the end positions of the adjusting means constituting the locked and released positions and/or the end positions are obtained in a different sequence but with the drive gear rotating in the same direction, because such arrangements secure a high gear reduction ratio, which means that a very small electric motor can be used for the actuator drive, in addition to which the rotation direction of the electric motor does not have to be changed in order to operate the actuator means, because the actuator springs can be biassed in alternating directions by an eccentric drive, thereby dispensing with the need for a complex electric/electronic control system.

Another embodiment of the sports shoe is also possible, in which the actuator means of the eccentric drive is electrically connected to the switch means via a control element, and a one-off brief pulse causes a pre-set half-rotation of the drive gear which maintains the eccentric pin in the end positions.

Finally, another embodiment of the sports shoe is possible, in which the control element, which might be a proximity sensor, a limit switch, etc., for example, is disposed on the guide and bearing sleeve and a pulse-generating element, e.g. a permanent magnet, is disposed on the drive gear, the advantage of which is that reliable operation is guaranteed for long periods.

BRIEF DESCRIPTION OF THE DRAWINGS

In order to provide a clearer understanding of the invention, it will be described in more detail below with reference to examples of embodiments illustrated in the appended drawings. Of these.

DETAILED DESCRIPTION OF PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 1:
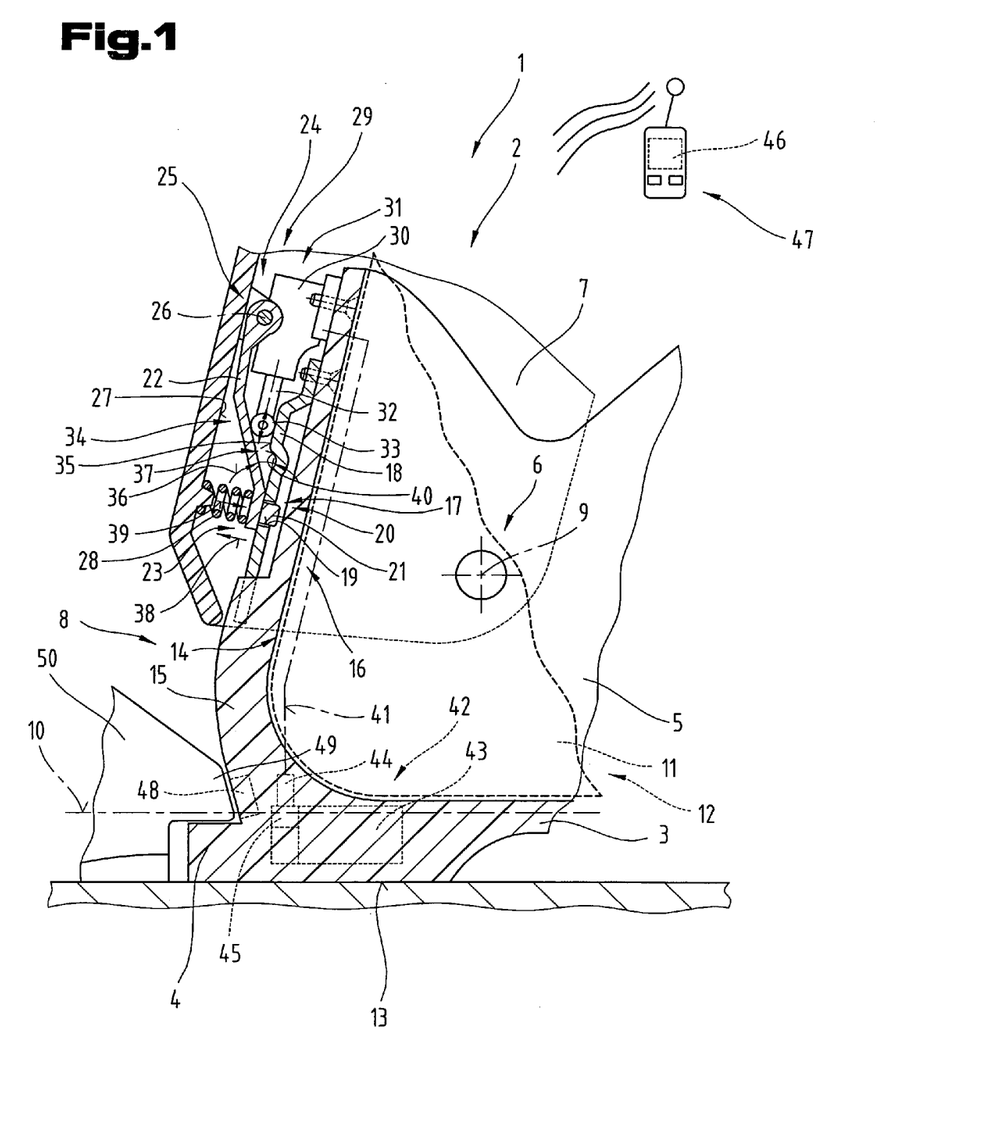
FIG. 1 is a view in elevation showing a section through a part-region of the sports shoe proposed by the invention with a lock mechanism.

FIG. 1 illustrates a sports shoe 1, in particular a ski shoe 2 consisting of a shoe bottom part 3 with a sole 4, and a cuff part 7 pivotably attached to a shell part 5 of the sports shoe 1 in articulated joints 6. The articulated joints 6 in which the cuff part 7 is articulated on the shell part 5, more or less in the heel region 8, form a pivot axis 9, which extends substantially perpendicular to a longitudinal axis 10 of the sports shoe 1 and is inclined relative to a support surface 13 depending on the position of an ankle and foot 11 of a user 12. Accordingly, the cuff part 7 is more or less adapted to the anatomy of the foot 11 and the way it is pivoted, and moves relative to the shell part 5 so that it is able to assume a so-called forwardly inclined position such as necessary when skiing and also to assume a normal position and pivoting motion to make the ski shoe 2 comfortable when standing or walking.

A lock mechanism 16 is provided more or less in an Achilles region 14 between a heel shell 15 of the shoe bottom part 3 and the cuff part 7, by means of which the pivoting action of the cuff part 7 can be blocked, by an adjustable locking means 17, when the foot 11 is in a forwardly inclined position as soon as the locking means 17 co-operates with a catch element 18 joined to the shell part 5.

In one possible embodiment illustrated in FIG. 1, the catch element 18, preferably consisting of a flat strip of metal extending perpendicular to the support surface 13, is attached to the shell part 5, and a seating 20 in the form of a bore 19 is provided for accommodating a catch pin 21 of the locking means 17. It also has a pivot leaver 22 incorporating the catch pin 21, the catch pin 21 being affixed to an end region 23 thereof, and which is mounted on the cuff part 7 at another end region 24 in a pivot bearing assembly 25 with a pivot axis 26 extending substantially parallel with the pivot axis 9 of the cuff part 7. In the end region 23 accommodating the catch pin 21, the pivot lever 22 is biassed about the pivot axis 26 of the pivot bearing assembly 25 against the catch element 18 by means of a compression spring 28 disposed between a terminal wall region 27 of the cuff part 7 and the end region 23, so that when the catch pin 21 is in a position coinciding with the bore 19 of the catch element 18 it engages in the latter, thereby blocking the pivoting motion of the cuff part 7 relative to the shell part 5 and the heel shell 15.

In order to selectively release the engagement of the catch pin 21 from the seating 20 of the catch element 18, an actuator drive 29 is affixed to the shell part 5, e.g. an actuator means 31 in the form of an electromagnet 30, in particular a linear drive. A pushrod 32 of the electromagnet 30 is provided with a roller-shaped slide element 33, which is supported on the catch element 18 as to be linearly displaceable—as indicated by double arrow 33—and is disposed on an adjustment region 34 of the pivot lever 22 extending at an angle thereto. This adjustment region 34 extends at a slight angle 36 to a surface 35 of the catch element 18, so that a conically shaped gap 37, tapering in the direction towards the support surface 13, is left free between the surface 35 of the catch element 18 and the adjustment region 34. When the slide element 33 is displaced by the electromagnet 30 in the direction towards the conically shaped taper, the pivot lever 22 is displaced in a pivoting motion about the pivot axis 26—as indicated by arrow 38—against the compression force—indicated by arrow 39—of the compression spring 28, as a result of which the catch pin 21 is moved so that it is released from the seating 20 and the cuff part 7 is then able to pivot about the pivot axis 9 relative to the shell part 5 again.

When the slide element 33 is in an extracted end position, in which the lock is released, the catch element 18 has a depth 40 which is adapted to the roller-shaped slide element 33, serving as the end positioning for the slide element 33 in order to prevent the linear drive 31 from shifting of its own accord. Consequently, in order to release the lock, electrical power has to be applied for a brief period only in order to displace the linear drive 31, and the extracted position is maintained, in the manner of a dead centre lock, until a counter-pulse is emitted, prompting a retraction of the push rod 32 with the slide element 33 onto the actuator means 31 so that the compression force applied by the compression spring 28—indicated by arrow 39—causes automatic locking, i.e. the catch pin 21 is located in the seating 20.

For operating purposes, the actuator drive 29 is connected via a line 41 to a power source 42, which is disposed in the sole 4 in the embodiment illustrated as an example here, for example a battery or rechargeable accumulator 43, and a switch means 44 is disposed upstream of the actuator drive 29 in order to apply power.

In a preferred embodiment, the switch means 44 has a signal receiver module 45 permitting wireless communication with a portable operating means 47 equipped with a signal transmitter module 46. Wireless communication is effected by a signal transmission in the short-wave or long-wave range.

The switch means 44 may also be connected to a coupling part 49, e.g. heel jaw 50, via a proximity sensor 48 integrated in the heel shell 15 to permit automatic operation, configured so that when the coupling part 49 moves towards the proximity sensor 48 a linear drive 31 is automatically powered in order to perform the locking process. A pulse for releasing the lock can also be emitted automatically, once the sports shoe 1 is secured to a sports device, e.g. a ski, by releasing the heel jaw 50.

Figure 2:
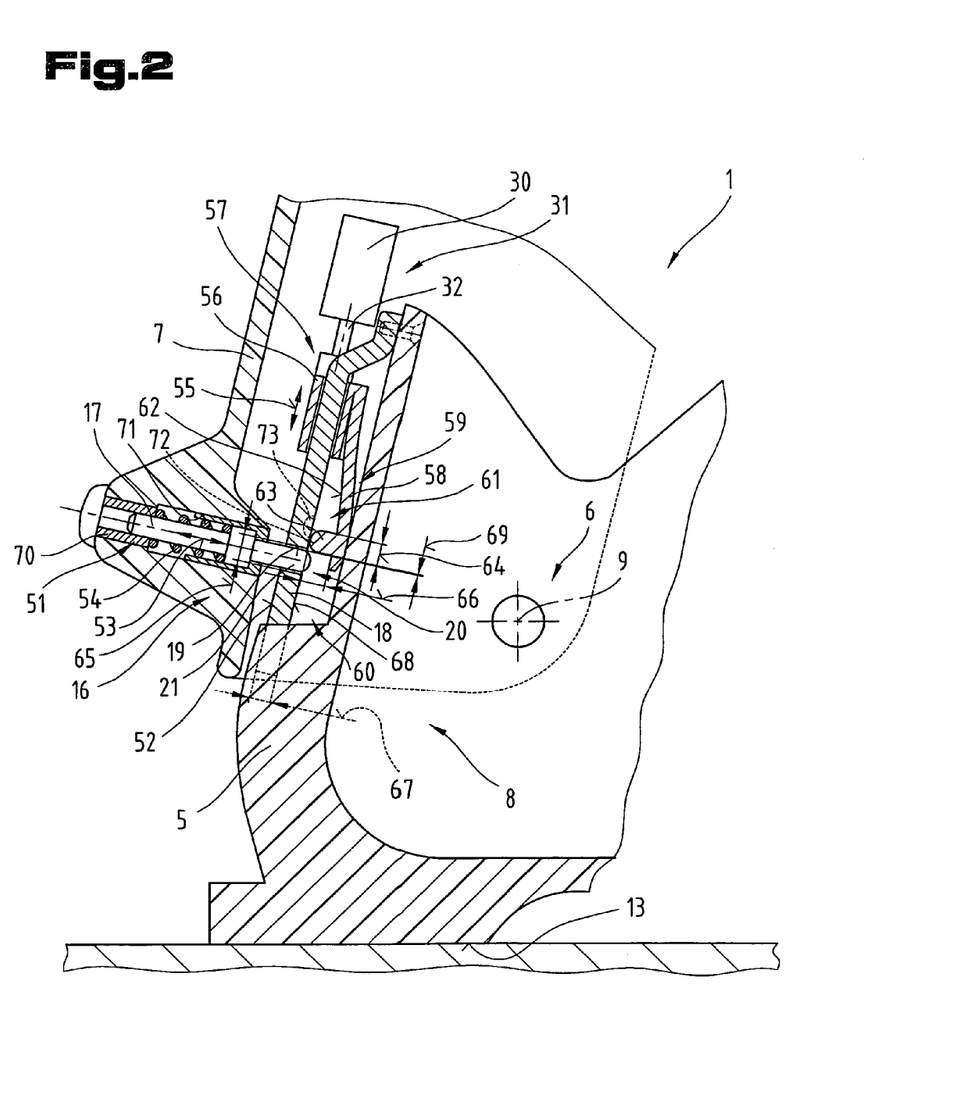
FIG. 2 is a view in elevation showing a section through a different embodiment of the part-region of the sports shoe.

FIG. 2 illustrates another embodiment of the sports shoe 1 with the lock mechanism 16 disposed between the shell part 5 and the cuff part 7. The strip-shaped catch element 18 extending in a substantially perpendicular direction is anchored relative to the support surface 13 of the sports shoe 1 in the heel region 8 between the cuff part 7 and the shell part 5 and at least one bore 19 is provided as a seating 20 for the catch pin 21 of the locking means 17.

The locking means 17 is preferably mounted in the shell part 7 so that it can be displaced in a sleeve-shaped guide insert 51 in a perpendicular direction towards a surface 52 of the catch element 18 facing the shell part 7—double arrow 53—and biassed in the direction of the catch element 18 by means of a compression spring 54, so that the catch pin 21 projects into the seating 20 of the catch element 18 in an end position which results in locking in order to prevent the cuff part 7 from pivoting about the pivot axis 9 of the articulated joints 6.

In order to release the lock, a slide 56 is mounted on the catch element 18 so that it can be displaced—as indicated by double arrow 55—and the catch element 18 serves as a linear guide assembly 57 for the slide 56. In order to displace the slide 56—as indicated by double arrow 55—the actuator means 31 is secured to the shell part 5 or the catch element 8, e.g. the electromagnet 30, and is drivingly linked to the slide 56 via the push rod 32.

The slide 56 is provided with a spring element 59, e.g. a leaf spring 58, overhanging in the direction of the seating 20 of the catch element 18 and extending in a gap 60 between the catch element 18 and the shell part 5. An overhanging end region 61 of the leaf spring 58 has a button-shaped closure means 63 facing the catch element 18 and standing proud of a surface 62 of the leaf spring 58, with a diameter 64 that is smaller than a diameter 65 of the bore 19 and a height 66 more or less corresponding to a thickness 67 of the catch element 18. When the leaf spring 58 is biassed in the direction of the catch element 18, the closure means 63 is pressed in the direction of a surface 68 of the catch element 18 facing the shell part 5 and the slide 56 is in an end position at a slight distance 69 from the bore 19 so that the catch pin 21 locates in the bore 19.

In order to release the system so that the cuff part 7 can pivot freely about the pivot axis 9, the actuator means 31 moves the slide 56 into a position in which the closure means 63 is in a position congruent with the bore 19 and, because the closure means 63 has rounded regions on its end face, the closure means 63 slides on the catch pin 21. Since the leaf spring 58 has a higher spring force than the spring force applied by the compression spring 58, the locking means 17 and the catch pin 21 are pushed out of the seating 20 or bore 19 and the bore 29 is filled by the closure means 63. The cuff part 7 is therefore able to pivot freely again because the catch pin is able to slide on the surface 52 of the lock element 18 unhindered and the fact that the bore 19 is filled by the closure element 63 prevents locking.

To establish a lock, power is applied to the actuator means 31, causing it to effect a reverse displacement so that the closure element 63 releases the bore 19 and the catch pin 21 automatically locates following a pivoting motion between the shell part 5 and the cuff part 7 placing the catch pin 21 and bore 19 in a congruent position.

In a preferred embodiment, the guide insert 51 with the locking means 17 and compression spring 54 and guide sleeve 70 for the locking means 17 are designed as a modular component which can be inserted in a housing 71 of the cuff part 7.

Instead of using the electromagnet 30 as the actuator means 31, it would naturally also be possible to use other linear drives, such as a spindle drive driven by an electric motor or an actuator cylinder operated with a pressurising medium, preferably using air as the medium.

The described embodiment also guarantees a low energy consumption because the actuator means 31 is powered only briefly with energy whenever the slide 56 has to be displaced between the end positions and the slide 56 can easily be designed so that it locks automatically in the two end positions. On the one hand, the end position resulting in the lock position is obtained when the closure means 63 locates in the bore 19 and, on the other hand, a catch lug 72 can be provided on the slide 56, e.g. made from an elastically deformable material, which engages with the catch recess 73 on the catch element 18 in the other end position in order to fix the end position.

Figure 3:
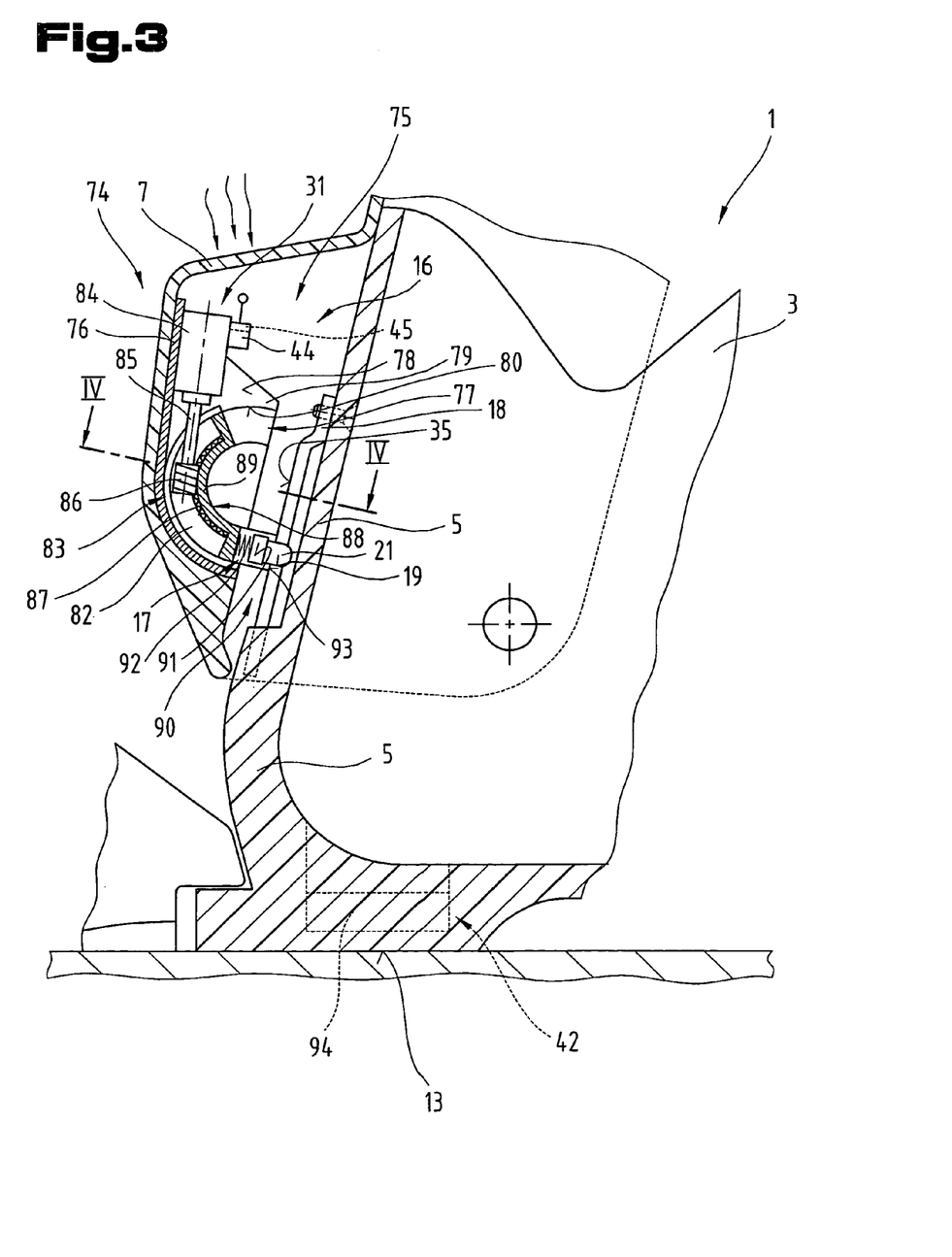
FIG. 3 shows another embodiment of the part-region of the sports shoe, viewed in section along line III-III indicated in FIG. 4.
Figure 4:
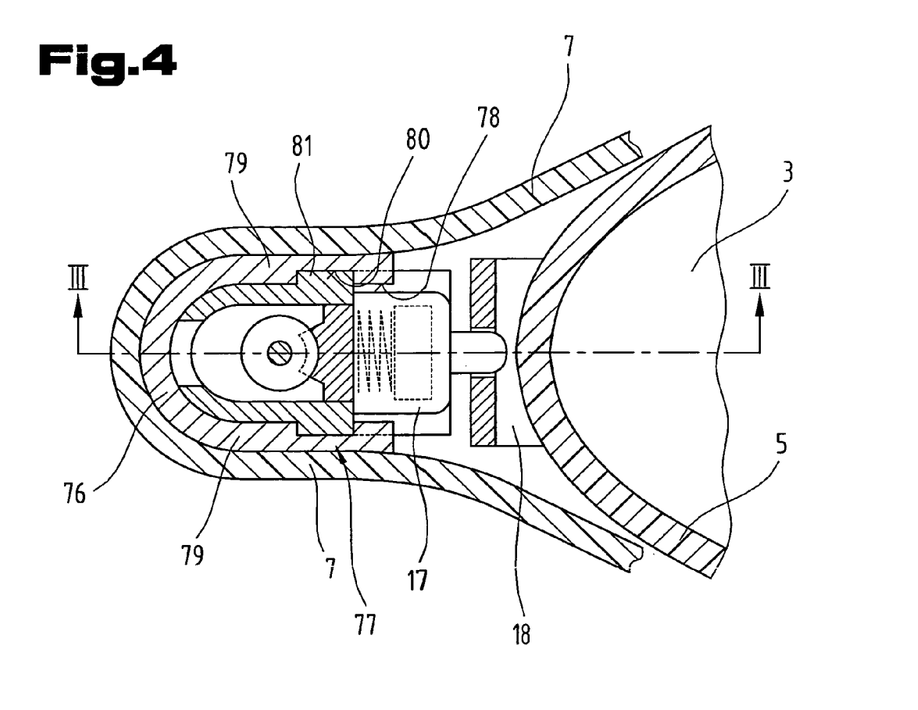
FIG. 4 shows the sports shoe, viewed in section along line IV-IV indicated in FIG. 3.
Figure 5:
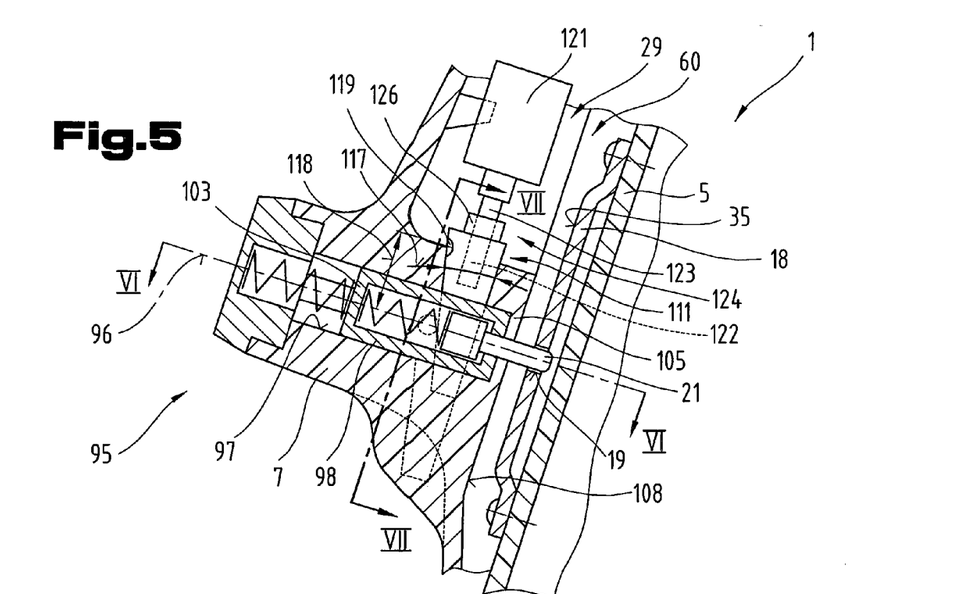
FIG. 5 is another embodiment of the lock mechanism, viewed in section along line V-V indicated in FIG. 6.
Figure 6:
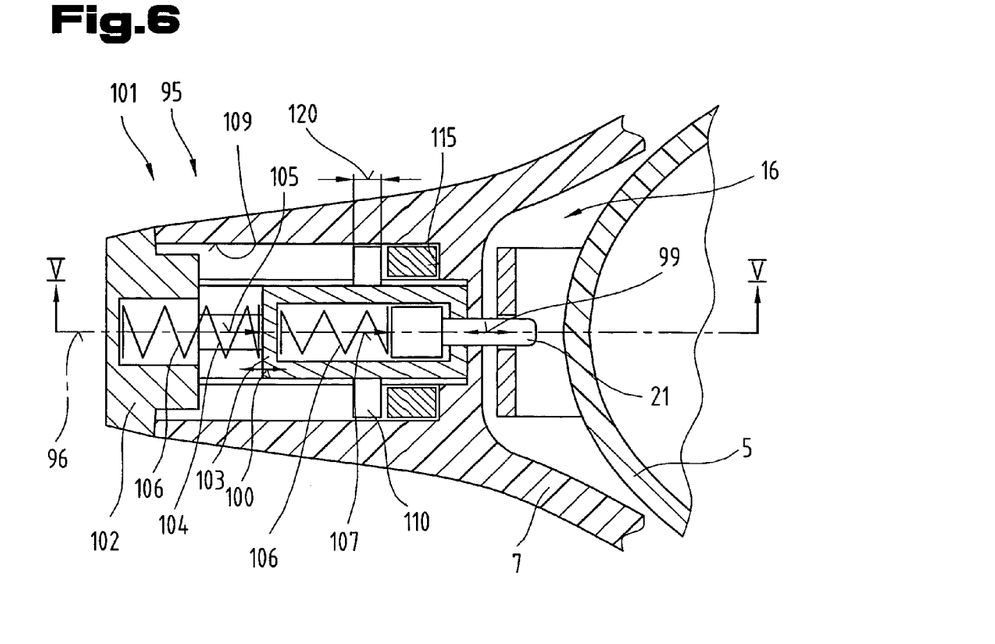
FIG. 6 shows the lock mechanism viewed in section along line VI-VI indicated in FIG. 5.
Figure 7:
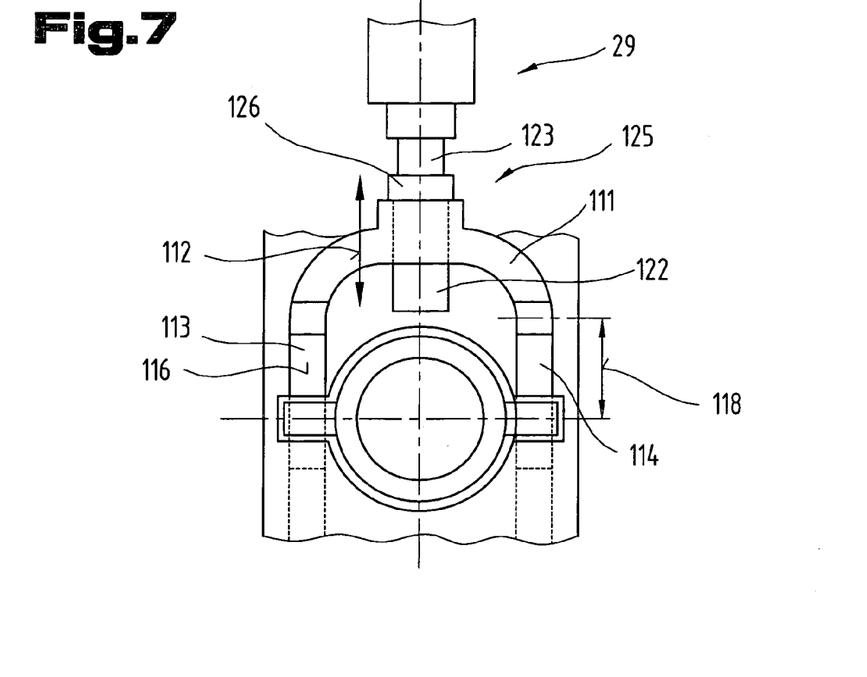
FIG. 7 shows a detail of the lock mechanism illustrated in FIG. 5.

FIGS. 3 and 4 illustrate another embodiment of the sports shoe 1 with the lock mechanism 16 between the shoe bottom part 3 and the cuff part 7. As described above, the catch element 18 extending substantially perpendicular to the support surface 13 is directed towards the cuff part 7, secured at a slight distance from the shell part 5, and has at least one bore 19 in which the catch pin 21 locates.

The lock mechanism 16 is a modular functional unit disposed in an external moulding 74 of the cuff part 7 shaped like a rucksack, which forms an open seating compartment 75 in the direction of the shell part 5. It consists of a U-shaped housing part 76, enclosing the locking means 17, which is mounted so as to be displaceable in a circular track-shaped guide system 77, and the actuator means 31. Disposed on mutually facing internal faces 78 of legs 79 of the housing part 76 are guide grooves 80 forming the circular track-shaped guide system 77, in which the locking means 17 is mounted by means of guide projections 81. The locking means 17 has an arcuately shaped adjusting part 82 matching the arcuate shape of the guide grooves 80, which can be displaced along the guide groove 77 with the actuator means 31, provided as an electric motor 84, by means of a worm gear 83. The worm gear 83 comprises a worm screw 86 disposed on a drive shaft 85 of the electric motor 84 and a worm gear section 87 facing it on a peripheral segment 88 of a wall part 89 of the adjusting part 82. The catch pin 21 is mounted so as to be displaceable in a pin housing 91 in the adjusting part 82 of the catch pin 21 at an end region, biassed by means of a compression spring 92, and thus projects beyond an end face 93 of the adjusting part 82 directed towards the catch element 18, so that when the adjusting part 82 is in one of the end positions, the catch pin locates in the bore 19 of the catch element 18 and thereby locks the cuff part 7 to the catch element 18 and hence the shell part 5.

In order to release the lock, the adjusting part 82 is moved in the arcuately shaped guide groove 77 by the worm gear 83 into an end position opposite the locked mode, so that the catch pin 21 is released from the bore 19, thereby releasing the lock.

By providing the worm gear 83, the displaceability of the adjusting part 82 is not automatically inhibited, which means that power has to be applied to the electric motor 84 only briefly in order to effect a displacement between the two end positions. The drive solution for the lock mechanism 16 is therefore low on power consumption, which means that a low capacity power source 42 can be used, e.g. a battery disposed in the shell part 5 or the rechargeable accumulator 94.

As may also be seen from FIG. 3, the electric motor 84 is provided with the switch means 44 incorporating the signal transmitter 45 for radio waves—indicated by arrows—permitting convenient remote operation of the releasing and locking action.

FIGS. 5 to 8 illustrate another embodiment of the sports shoe 1, showing the lock mechanism 16 between the shell part 5 and the cuff part 7 in the locked position. The catch element 18 incorporating at least one bore 19 is secured to the shell part 5 in the gap 60. The cuff part 7 has a projection 95 of a truncated cone shape, extending around a mid-axis 96 more or less perpendicular to the surface 35 of the catch element 18, which is integral with the cuff part 7. In this projection 95, a housing sleeve 98 is provided in a bore 97 disposed coaxially with the mid-axis, inside which the catch pin is mounted so as to be displaceable—double arrow 99—and is itself displaceable—as indicated by double arrow 100. A compression spring 104 is provided between a closure stopper 102 which closes off an end region 101 of the bore 97 of the projection 95 and an end wall 103 of the housing sleeve 98 facing it, which biases the housing sleeve 98—as indicated by the arrow—in the direction of a stop shoulder 105 of the cuff part 7 facing the catch element 18.

Another compression spring 106 is disposed in the housing sleeve 98 between the end wall 103 and the catch pin 21, which biases the catch pin 21 in the housing sleeve 98 into an end position—as indicated by arrow 107—in which the catch pin 21 projects beyond a surface 108 facing the catch element 18 and in which the catch element 18 is positioned congruently with the bore 19 and locates in it.

Also provided in the bore 97, lying diametrically opposite and extending parallel with the mid-axis 96, are guide grooves 109 for guide pins 110 provided on the housing sleeve 98. The guide grooves 109 co-operating with the guide pins 110 provide linear guidance for the housing sleeve in the bore 97 of the projection 95 and prevent it from rotating.

In the cuff part 7, a release slide 111 is also provided, which encloses the housing sleeve 98 in the form of a U-shaped bracket, which is mounted so as to be displaceable by the actuator drive 29 in the direction extending more or less perpendicular to the support surface 13 of the sports shoe 1—as indicated by double arrow 112. Legs 113, 114 of the release slide 111 extend through the guide grooves 109 between the guide pins 110 and a bearing surface 115 of the guide grooves 109 facing the surface 108 of the cuff part 7. The bearing surfaces 115 extend in a plane parallel with the surface 108. The legs 113, 114 are wedge-shaped and the wedge slope faces the guide pins 110 so that positioning surfaces 116 facing the guide pins 110 extend at an angle in the displacement direction—indicated by double arrow 112. A wedge angle 117 is approximately between 10° and 30°. The fact of providing a wedge-shape design enables the release slide 111 to be displaced in the direction of the housing sleeve 98, which is displaced against the spring force of the compression spring 104—as indicated by the arrow—so that the catch pin 21 is released from the bore 19 in a releasing action, thereby enabling the cuff part 7 to pivot freely relative to the shell part 5.

When the release slide 111 is moved into an end position to effect a release, along a displacement path 118, the positioning surfaces 116 have recesses 119 which accommodate certain regions of the bearing pins 110 by their periphery and match a diameter 120 of the guide pins 110, thereby serving a positioning function.

In the embodiment illustrated as an example here, the actuator drive 29 is an electric motor 121, in particular an alternating current motor, with a threaded spindle 122 serving as the motor shaft 123 and acting as a transmission means 124 between the actuator drive 29 and the lock mechanism 16. The threaded spindle 122 locates by the thread in a spindle nut 126 secured to a base leg 125. Consequently, a rotating motion of the motor shaft 123 is converted into a linear motion of the release slide 111. By selecting the thread pitch of the threading of the threaded spindle 122 and spindle nut 126 accordingly, a self-inhibiting action can be achieved with this embodiment, thereby preventing an automatic displacement against the action of the compression spring in the energy-free state, and energy need be applied to the actuator drive 29 only briefly in order to displace the release slide 111 from one end position into the other end position. This enables an energy-saving drive system to be provided for the locking and releasing process.

In the embodiment illustrated in FIGS. 5 to 8, the actuator drive 29 moves the slide 111 in the direction of the electric motor 121 into the end position 29 resulting in the locked position. Under the action of the compression spring 104, the housing sleeve 98 is forced against the stop shoulder 105 and the catch pin 21 located in the bore 19 of the catch element 18.

In order to release it, the slide 111 is moved in the opposite direction as described above and the housing sleeve 98 is therefore moved against the spring force, as indicated by the arrow, thereby moving the catch pin 21 out of engagement with the bore 19.

Figure 8:
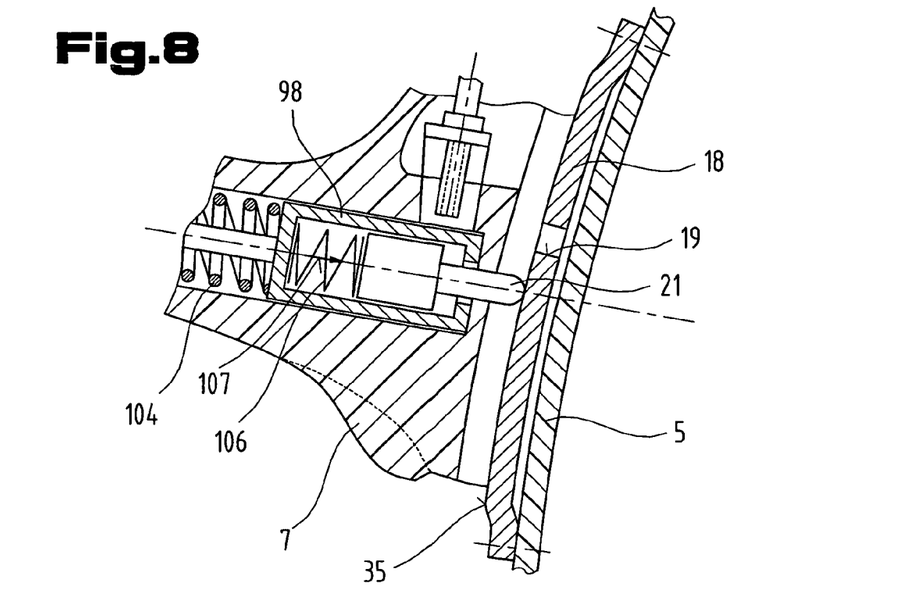
FIG. 8 shows another detailed view of the lock mechanism illustrated in FIG. 5, viewed in section.

Whenever the system has to be locked again but the catch pin 21 and bore 19 are not congruently positioned due to the pivoting action of the cuff part 7 relative to the shell part 5, as illustrated in FIG. 8, the end face of the catch pin 21 is moved into abutment with the surface 35 of the catch element 18. The catch pin 21 is therefore pushed against the action of the compression spring 106 into the interior of the housing sleeve 98. As soon as a pivoting motion brings the cuff part 7 into a position in which the catch pin 21 and the bore 19 coincide, the catch pin 21 is then able to locate in the bore 19 due to the spring force of the compression spring 106—indicated by arrow 107—as a result of which the cuff part 7 is locked in the predefined angular position relative to the shell part 5. It should also be pointed out that for the locking function, the spring force of the compression spring 104 acting on the housing sleeve 98—indicated by the arrow—must be greater than the spring force exerted on the catch pin by the compression spring 106—as indicated by arrow 107.

Figure 9:
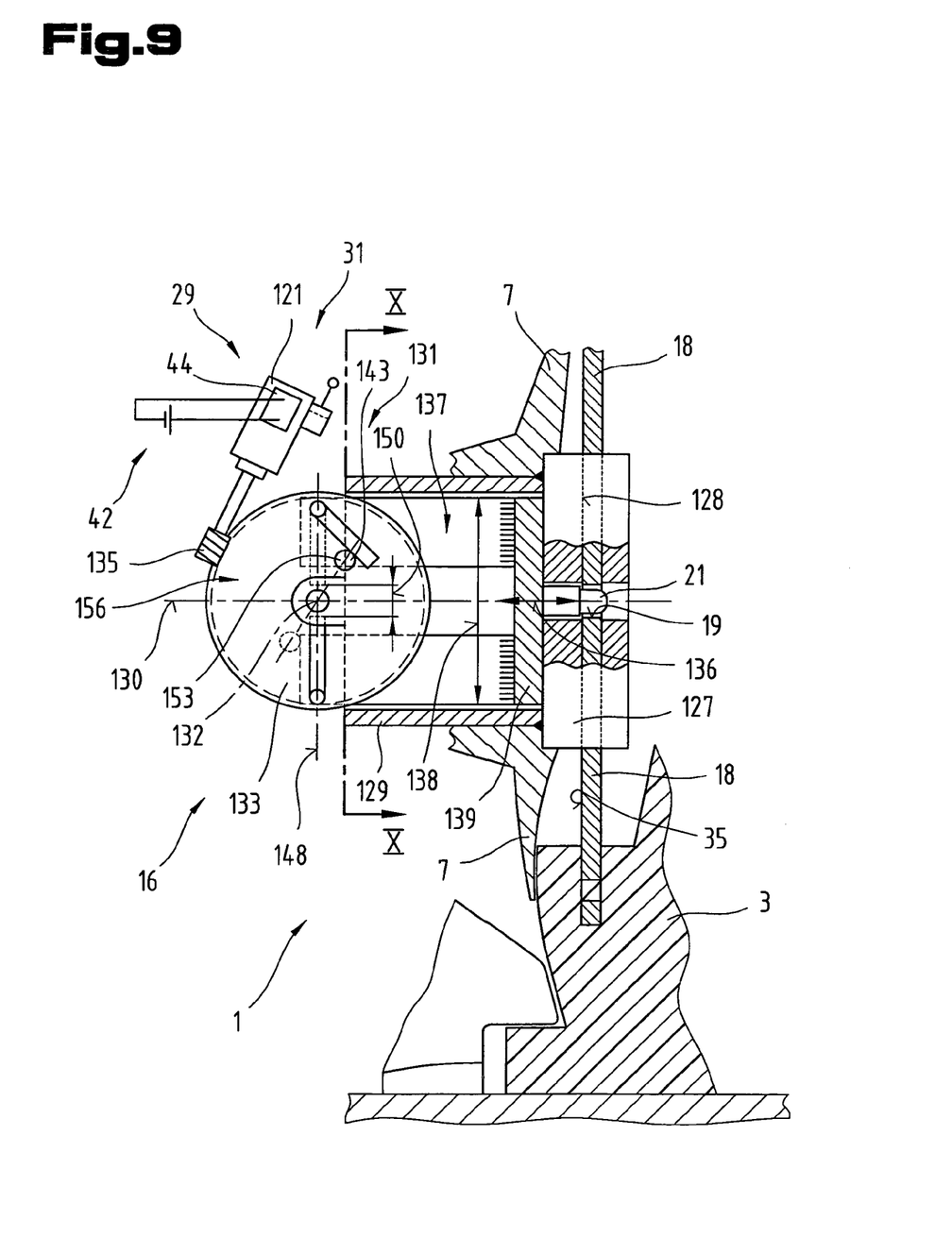
FIG. 9 shows another embodiment of a lock mechanism of a sports shoe, viewed in section along line IX-IX indicated in FIG. 10.
Figure 10:
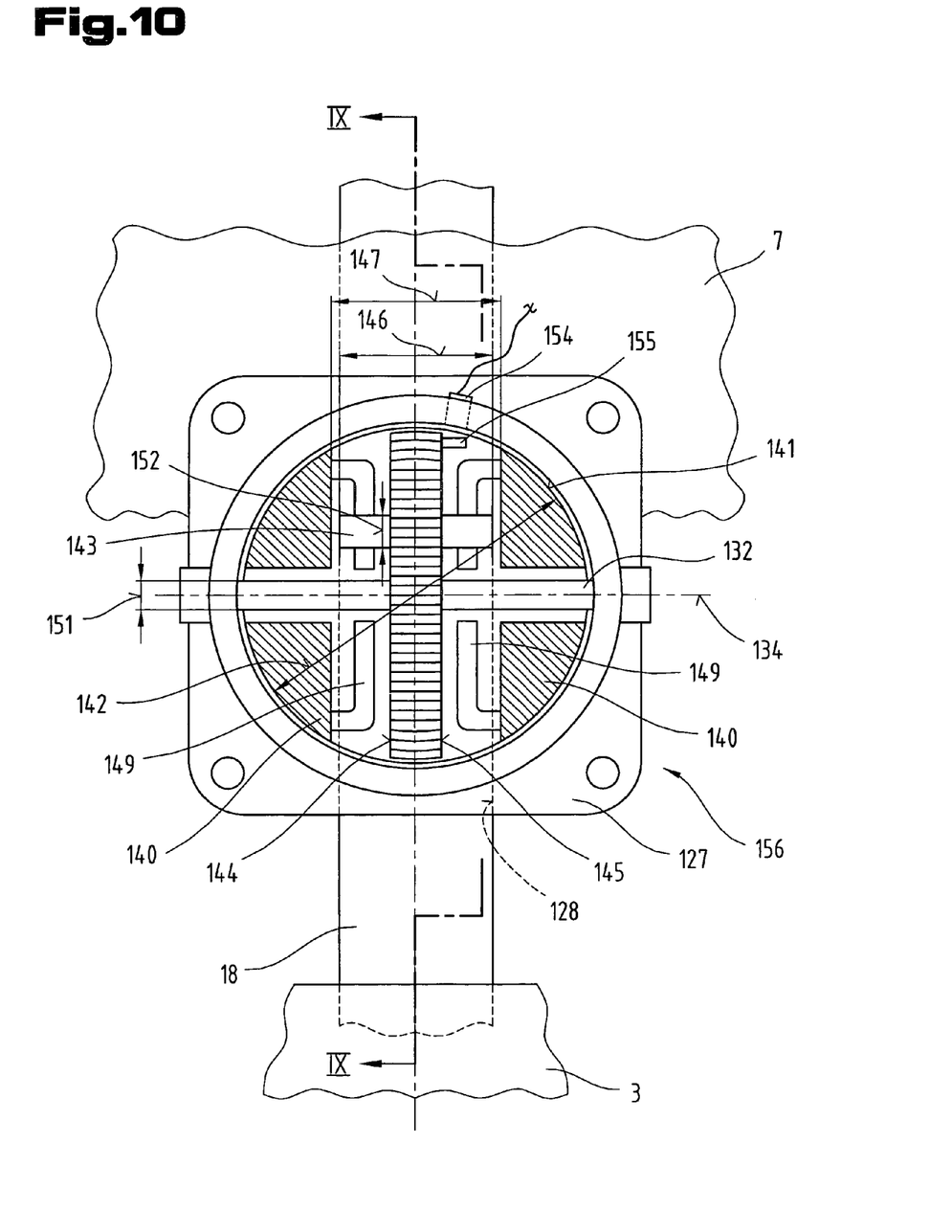
FIG. 10 shows the lock mechanism viewed in section along line X-X indicated in FIG. 9.

FIGS. 9 and 10 illustrate a different embodiment of the sports shoe 1, essentially comprising the shoe bottom part 3 and cuff part 7, with the lock mechanism 16. The strip-shaped catch element 18 is fixedly connected to the shoe bottom part 3 and is provided with at least one bore 19 in which the catch pin 21 locates, so that when the catch pin 21 extends through the bore 19, the pivoting action of the cuff part 7 relative to the shoe bottom part 3 is blocked.

The lock mechanism 16 consists of a guide housing 127 affixed to the cuff part 7, with a guide slot 128, by means of which the catch element 18 is guided. Secured to this guide housing 127 is a guide and bearing sleeve 129, which extends with its mid-axis 130 in the direction perpendicular to the surface 35 of the catch element 18. In an end region 131 of the guide and bearing sleeve 129, a drive gear 133, e.g. a worm gear, toothed gear, etc., rotatable about a rotation shaft 132, is mounted so as to rotate about a mid-axis 134 extending parallel with the surface 35 and is drivingly connected by means of a pinion wheel 135 to a worm gear, for example, of the actuator drive 29, and in the embodiment illustrated as an example here, the actuator means 31 is an electric motor 121 and is provided with the switch means 44 via which it is conductively connected to the power source 42, e.g. a battery.

A positioning means 137 incorporating the catch pin 21 is displaceably mounted in the guide and bearing sleeve 129 so that it can be displaced in the direction of double arrow 136, and has a washer 139 facing the guide housing 127 which is adapted to an internal diameter 138 of the guide and bearing sleeve 129, joined to four guide blocks 140 projecting into the guide and bearing sleeve 129, which accommodate the rotation shaft 132 and the worm gear 133 between them. A circle 141 circumscribing the guide blocks 140 has a diameter 142 which is slightly smaller than the internal diameter 138 of the guide and bearing sleeve 129. Consequently, the positioning means 137 is guided in an exact linear motion in the guide and bearing sleeve 129.

The drive gear 133 is provided with an eccentric pin 143, which projects beyond opposing side faces 144, 145 of the drive gear 133. However, a length 146 of the eccentric pin 143 is smaller than a gap width 147 between the oppositely lying guide blocks 140 of the positioning means 137.

In a plane 148 containing the mid-axis 134 of the rotation shaft 132, actuator springs 149 which co-operate with the eccentric pin 143 in a paired arrangement are secured to the oppositely lying guide blocks 140, and are made from spring wire for example, and when they are in the non-biassed position, they extend in the plane 148 and project towards one another in the direction of the mid-axis 130 so that a distance 150 of the end regions of the positioning springs 149 projecting towards one another is greater than a diameter 151 of the rotation shaft 132 and a diameter 152 of the eccentric pin 143.

The positioning means 137 of the lock mechanism 16 is displaced by operating the switch element 44, as a result of which the actuator drive 29 moves the drive gear 133 in the rotation direction, so that the drive gear 133 is displaced in rotation respectively by 180° via the switch means 44 between two respective switching procedures. In these end positions, the pairs of actuator springs 149 connected alternately to the guide blocks 140 are biassed in the direction of the catch element 18 and in the opposite direction by the eccentric pin 143. As a result of the predefined distance 150 between the end regions of the positioning springs 149 extending towards one another, the spring tension is released in a position in which an eccentric axis 143 of the eccentric pin 143 intersects the mid-axis 130, enabling the movement of the positioning means 137 to be reversed between a locking and a releasing position. This means that, in order to bias the actuator means 137 into the selective desired positions in order to lock or release the pivoting motion of the cuff part 7, the associated end positions of the eccentric pin 143 must be disposed in a position which is angularly offset from the mid-axis 130.

In order to activate the actuator means 31, e.g. the electric motor 121, to produce the requisite rotation of the drive hear 133, the switch means 44 is conductively connected to a control element 154, for example a limit switch or proximity sensor, etc., attached to the guide and bearing sleeve, which co-operates with a pulse-generating element 155 disposed on the drive gear 133, thereby offering a simple switching system which produces a rotating motion of 180° between every two pulses.

By using an eccentric drive 156 of this design, it is not necessary to reverse the rotation direction of the electric motor 121 in order to assume the requisite position constituting the end positions of the actuator means 137 which lock and release the pivoting motion of the cuff part 7.

Figure 11:
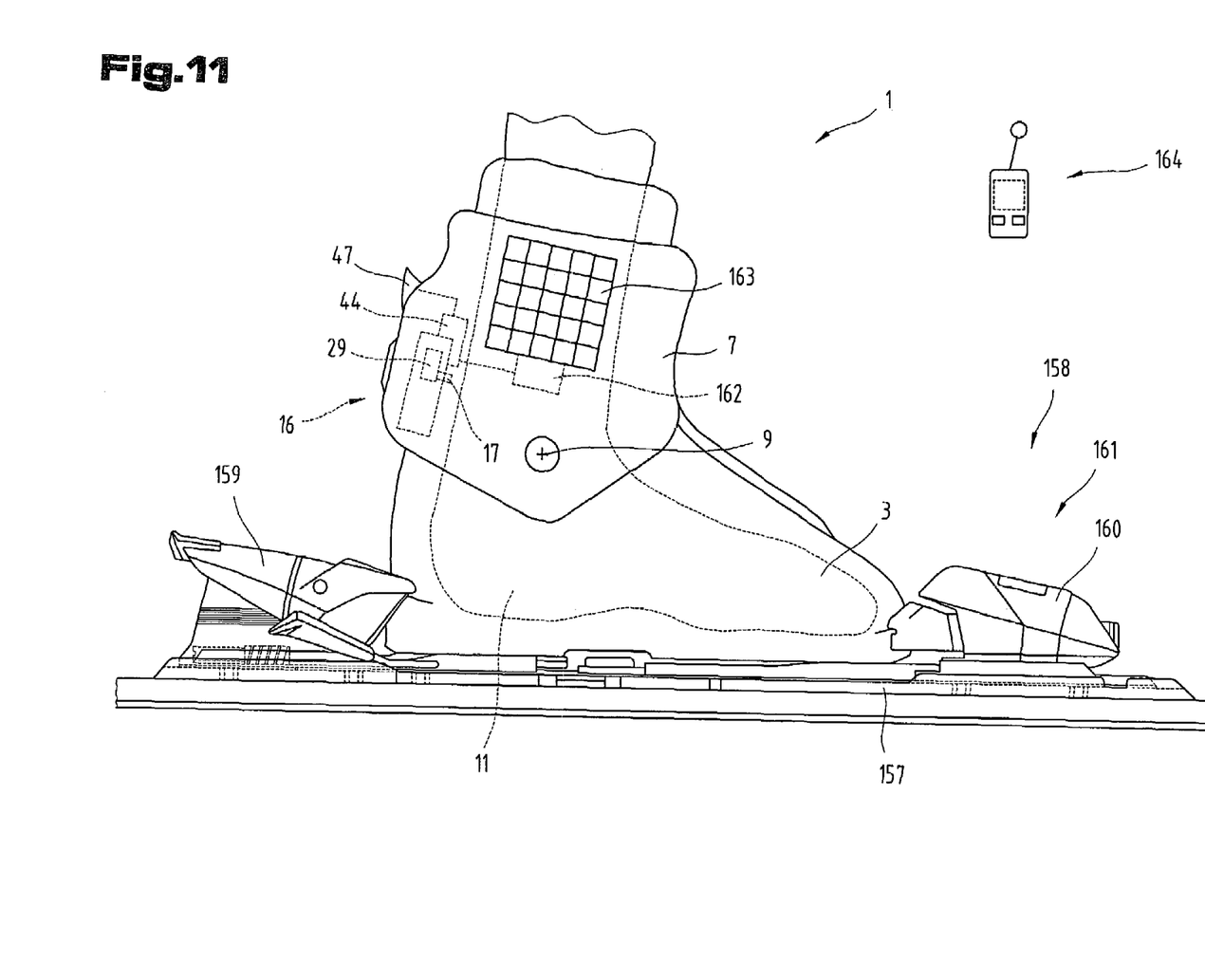
FIG. 11 is a view in elevation depicting the sports shoe proposed by the invention as a whole, fitted on a sports device.

The sports shoe 1 illustrated in FIG. 11 is attached to a sports device 157, e.g. a ski, board, etc., by means of a coupling mechanism 158, e.g. a ski binding 161 comprising a heel jaw 159 and a front jaw 160. The sports shoe 1 essentially consists of the shoe bottom part 3 and the cuff part 7 which is connected to the shoe bottom part 3 so that it can be pivoted about the pivot axis 9. Disposed between the shoe bottom part 3 and the cuff part 7 is the lock mechanism 16, by means of which the pivoting motion of the cuff part 7 can be locked or released for the intended use, namely for skiing, or adapted directly for a particular type of movement.

To this end, a power store 162, e.g. a battery, accumulator, pressure store, spring motor, etc., is disposed in the shoe bottom part 3. A solar cell unit 163 is illustrated as the means for supplying power in this example. Other options include making use of the motion energy in the sports shoe 1 and sports device 157 by fitting a piezo element, induction generator or by using fuel cells or a compressor, etc.

The lock mechanism 16 consists of the actuator drive 29 conductively connected to the power store for the locking means 17, e.g. an electromagnet, electric motor, pressure cylinder, spring motor etc., and the switch means 44 connected upstream of the actuator drive 29, e.g. a manually operable switch element, which can be controlled wirelessly or remotely using signal transmitter and signal receiver means, etc., and ultimately a signal transmitter and signal receiver device 164 which can be used with other items of portable equipment and in any combination, e.g. a watch, mobile telephone, PDA, WRISTOP etc.

The embodiments given as examples illustrate possible variants of the sports shoe and it should be pointed out at this stage that the invention is not specifically restricted to these variants, but rather the individual variants may be used in any combination with one another, these possible variations being within the ability of the person skilled in this field on the basis of the technical teaching of the invention. Accordingly, all conceivable able variants which could be obtained by combining individual details from the described and illustrated embodiments are included within the scope of the invention.

Finally, for the sake of good order, it should be pointed out that in order to provide a clearer understanding of the design of the sports shoe, it and its constituent parts are illustrated to a certain extent out of scale and/or on an enlarged scale and/or on a reduced scale.

The underlying objectives and the solutions proposed by the invention may be found in the description.

Above all, the embodiments of the invention illustrated in FIGS. 1; 2; 3, 4; 5, 6, 7, 8; 9, 10; 11 may be construed as independent solutions proposed by the invention in their own right. The objectives and associated solutions proposed by the invention may be found in the detailed descriptions of these drawings.

List of Reference Numbers

1 Sports shoe
2 Ski shoe
3 Shoe bottom part
4 Sole
5 Shell part
6 Articulated joint
7 Cuff part
8 Heel region
9 Pivot axis
10 Longitudinal axis
11 Foot
12 User
13 Support surface
14 Achilles region
15 Heel shell
16 Lock mechanism
17 Locking means
18 Catch element
19 Bore 20 Seating
21 Catch pin
22 Pivot lever
23 End region
24 End region
25 Pivot bearing assembly
26 Pivot axis
27 Terminal wall region
28 Compression spring
29 Actuator means
30 Electromagnet
31 Actuator means
32 Push rod
33 Slide element
34 Adjustment region
35 Surface
36 Angle
37 Gap
38 Arrow
39 Arrow
40 Recess
41 Line
42 Power source
43 Accumulator
44 Switch means
45 Signal receiver module
46 Signal transmitter module
47 Operating means
48 Proximity sensor
49 Coupling part
50 Heel jaw
51 Guide insert
52 Surface
53 Double arrow
54 Compression spring
55 Double arrow
56 Slide
57 Guide assembly
58 Leaf spring
59 Spring element
60 Gap
61 End region
62 Surface
63 Closure element
64 Diameter
65 Diameter
66 Height
67 Thickness
68 Surface
69 Distance
70 Guide sleeve
71 Housing
72 Catch lug
73 Cast recess
74 External moulding
75 Seating compartment
76 Housing part
77 Guide arrangement
78 Internal face
79 Leg
80 Guide groove
81 Guide projection
82 Adjusting part
83 Worm gear
84 Electric motor
85 Drive shaft
86 Worm
87 Worm gear section
88 Peripheral segment
89 Wall part
90 End region
91 Pin housing
92 Compression spring
93 End face
94 Accumulator
95 Projection
96 Mid-axis
97 Bore
98 Housing sleeve
99 Double arrow
100 Double arrow
101 End region
102 Closure stopper
103 End wall
104 Compression spring
105 Stop shoulder
106 Compression spring
107 Arrow
108 Surface
109 Guide groove
110 Guide pin
111 Release slide
112 Double arrow
113 Leg
114 Leg
115 Bearing surface
116 Adjustment surface
117 Wedge angle
118 Displacement path
119 Recess
120 Diameter
121 Electric motor
122 Threaded spindle
123 Motor shaft
124 Transmission means
125 Base leg
126 Spindle nut
127 Guide housing
128 Guide slot
129 Guide and bearing sleeve
130 Mid-axis
131 End region
132 Rotation shaft
133 Drive gear
134 Mid-axis
135 Drive pinion
136 Double arrow
137 Positioning means
138 Internal diameter
139 Washer
140 Guide block
141 Circumscribing circle
142 Diameter
143 Eccentric pin
144 Side face
145 Side face
146 Length
147 Gap width
148 Plane
149 Actuator springs
150 Distance
151 Diameter
152 Diameter
153 Eccentric axis 154 Control element
155 Pulse-generating element
156 Eccentric drive
157 Sports device
158 Coupling mechanism
159 Heel jaw
160 Front jaw
161 Ski binding
162 Energy store
163 Solar cell unit
164 Signal transmitter and receiver device

What is claimed is:

1. Sports shoe comprising of a shoe bottom part comprising a sole and a shell part, and a cuff part pivotably connected to the shoe bottom part and incorporating a lock mechanism with at least one locking means displaceable between the shell part and the cuff part, and having an electromotive actuator drive for the locking means, wherein a tubular guide and bearing sleeve is fixedly disposed on the cuff part and bears a positioning means incorporating a catch pin such that it can be displaced in a direction perpendicular to the direction of a surface of the catch element, the actuator drive of the locking means is an eccentric drive driven by an electric motor with a rotatably mounted drive gear with an eccentric pin, with a rotation shaft extending parallel with the surface on the guide and bearing sleeve.

2. Sports shoe as claimed in claim 1, wherein the positioning means is displaceably mounted by means of the eccentric pin in actuator springs which are biased in the direction perpendicular to the surface of the catch element between a position in which the catch pin is locked and released.

3. Sports shoe as claimed in claim 1, wherein springs biased by the eccentric pin are disposed on the actuator drive in a stationary arrangement and are made from spring wire.

4. Sports shoe as claimed in claim 1, wherein the drive gear rotates by 180° between the end positions of the actuator drive to effect a locking and releasing action.

5. Sports shoe as claimed in claim 4, wherein the end positions are reached in alternating sequence by rotating the drive gear in the same direction.

6. Sports shoe as claimed in claim 1, wherein the actuator drive is conductively connected to an energy store and/or a power source disposed in the shoe bottom part or in the cuff part, and a switch means is connected upstream of the actuator drive for supplying the actuator drive with power from the power source and/or the energy store.

7. Sports shoe as claimed in claim 6, wherein the switch means can be controlled via an operating means.

8. Sports shoe as claimed in claim 7, wherein the operating means is a wireless remote control.

9. Sports shoe as claimed in claim 7, wherein the operating means has a signal transmitter module and the switch means has a signal receiver module for effecting a wireless signal transmission in the short-wave frequency range.

10. Sports shoe as claimed in claim 7, wherein the operating means has a signal transmitter module and the switch means has a signal receiver module for effecting a wireless signal transmission in the long-wave frequency range.

11. Sports shoe as claimed in claim 7, wherein the operating means and/or the switch means is provided with the signal transmitter module and the signal receiver module for a one-way or two-way signal transmission.

12. Sports shoe as claimed in claim 7, wherein the operating means is a signal transmitting and receiving device.

13. Sports shoe as claimed in claim 12, wherein the signal transmitting and receiving device is a watch, mobile telephone, PDA or WRISTOP.

14. Sports shoe as claimed in claim 7, wherein the operating means is provided in the form of a switch element disposed on the cuff part or shell part.

15. Sports shoe as claimed in claim 7, wherein the operating means is a proximity sensor.

16. Sports shoe as claimed in claim 7, wherein the operating means is disposed on the cuff part or shell part or a sports device.

17. Sports shoe as claimed in claim 6, wherein the energy store is a rechargeable accumulator, battery, fuel cell, or pressure store.

18. Sports shoe as claimed in claim 17, wherein the energy source is a rechargeable accumulator, battery, fuel cell or pressure store.

19. Sports shoe as claimed in claim 6, wherein the energy store is conductively connected to the power source disposed in the shell part and/or on the cuff part.

20. Sports shoe as claimed in claim 19, wherein the power source is a solar cell unit, piezo element or inductive generator.

21. Sports shoe as claimed in claim 6, wherein the actuator drive is conductively connected to the switch means via a control element.

22. Sports shoe as claimed in claim 21, wherein the control element is disposed on the guide and bearing sleeve and a pulse-generating element is disposed on the drive gear.

23. Sports shoe as claimed in claim 22, wherein the control element is a proximity sensor or a limit switch.

24. Sports shoe as claimed in claim 22, wherein the pulse generating means is a permanent magnet.

* * * * *